(12) United States Patent
Tsai et al.

(10) Patent No.: US 10,805,014 B2
(45) Date of Patent: Oct. 13, 2020

(54) REDUCING DEGRADATION OF WIRELESS SIGNALS

(71) Applicant: HEWLETT-PACKARD DEVELOPMENT COMPANY, L.P., Spring, TX (US)

(72) Inventors: Ming-Shien Tsai, Taipei (TW); Chang-Cheng Hsieh, Taipei (TW); Tzu-Chiang Cheng, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/481,480

(22) PCT Filed: Jun. 28, 2017

(86) PCT No.: PCT/US2017/039638
§ 371 (c)(1),
(2) Date: Jul. 28, 2019

(87) PCT Pub. No.: WO2019/005024
PCT Pub. Date: Jan. 3, 2019

(65) Prior Publication Data
US 2020/0119817 A1    Apr. 16, 2020

(51) Int. Cl.
*H04B 15/00* (2006.01)
*G06F 9/4401* (2018.01)
*G09G 5/00* (2006.01)
*H04B 1/04* (2006.01)

(52) U.S. Cl.
CPC ......... *H04B 15/005* (2013.01); *G06F 9/4403* (2013.01); *G09G 5/006* (2013.01); *H04B 1/0475* (2013.01); *G09G 2370/16* (2013.01)

(58) Field of Classification Search
CPC ... H04B 15/005; H04B 1/0475; G06F 9/4403; G09G 5/006; G09G 2370/16
USPC ......................................................... 375/285
See application file for complete search history.

(56) References Cited

U.S. PATENT DOCUMENTS

| | | | |
|---|---|---|---|
| 8,095,072 B2 | 1/2012 | Zheng et al. | |
| 8,538,492 B2 | 9/2013 | Sweeney et al. | |
| 8,606,181 B2 | 12/2013 | Hsia et al. | |
| 9,496,932 B1* | 11/2016 | Prendergast | ......... H04B 7/0417 |
| 2003/0198307 A1* | 10/2003 | Neill | ...................... H04B 15/02 375/346 |

(Continued)

FOREIGN PATENT DOCUMENTS

| WO | WO-2012088460 A2 | 6/2012 |
|---|---|---|
| WO | WO-2014028919 A1 | 2/2014 |
| WO | WO-2015073024 A1 | 5/2015 |

OTHER PUBLICATIONS

Otey, M, "Windows 7 Keyboard Shortcuts", Apr. 9, 2010.

*Primary Examiner* — Don N Vo
(74) *Attorney, Agent, or Firm* — Fabian VanCott

(57) ABSTRACT

Improving a status of a wireless signal includes a display, a wireless transceiver, a processor and memory to monitor a status of a wireless signal of the wireless transceiver and a Basic Input Output System (BIOS) to, in response to the status indicating a degradation of the wireless signal and receiving a command to improve the status of the wireless signal, modify a parameter of an enhanced display port (eDP) signal of the display to reduce interference with the wireless signal generated by the display of the computer.

20 Claims, 8 Drawing Sheets

(56) References Cited

U.S. PATENT DOCUMENTS

| | | | |
|---|---|---|---|
| 2010/0141613 A1* | 6/2010 | Sonobe | G09G 5/18 345/204 |
| 2010/0265933 A1* | 10/2010 | Hijazi | G09G 5/18 370/345 |
| 2016/0266768 A1 | 9/2016 | Han et al. | |
| 2016/0275897 A1* | 9/2016 | Lin | G09G 3/3688 |
| 2016/0295427 A1 | 10/2016 | Baratzadeh et al. | |
| 2017/0013528 A1 | 1/2017 | Gassend | |
| 2017/0179996 A1* | 6/2017 | Knepper | H01Q 1/2291 |
| 2018/0005597 A1* | 1/2018 | Kumar | G09G 5/006 |

* cited by examiner

| Register(s) 602 | Voltage Swing Value(s) 604 | Pre-Emphasis Value(s) 606 |
|---|---|---|
| Register 0 602-1 | Voltage Swing Value A 604-1 | Pre-Emphasis Value A 606-1 |
| Register 1 602-2 | Voltage Swing Value B 604-2 | Pre-Emphasis Value B 606-2 |
| Register 2 602-3 | Voltage Swing Value C 604-3 | Pre-Emphasis Value C 606-3 |

*Fig. 6*

REDUCING DEGRADATION OF WIRELESS SIGNALS

BACKGROUND

A Wi-Fi network is a wireless local area network that enables a computer such as a desktop computer, a laptop, a tablet or a smart phone to wirelessly communicate with other computers, peripheral devices and the Internet. To wirelessly communicate, the computer includes networking hardware, such as a wireless transceiver. The wireless transceiver includes a processor, memory and an antenna that allows the computer to connect to the Wi-Fi network, via a wireless signal, such that the computer can exchange data with the other computers, the peripheral devices and the internet.

BRIEF DESCRIPTION OF THE DRAWINGS

The accompanying drawings illustrate various examples of the principles described herein and are a part of the specification. The examples do not limit the scope of the claims.

FIG. 6 is a diagram of parameters of an eDP signal, according to one example of principles described herein.

Throughout the drawings, identical reference numbers designate similar, but not necessarily identical, elements.

DETAILED DESCRIPTION

Figure 1A:
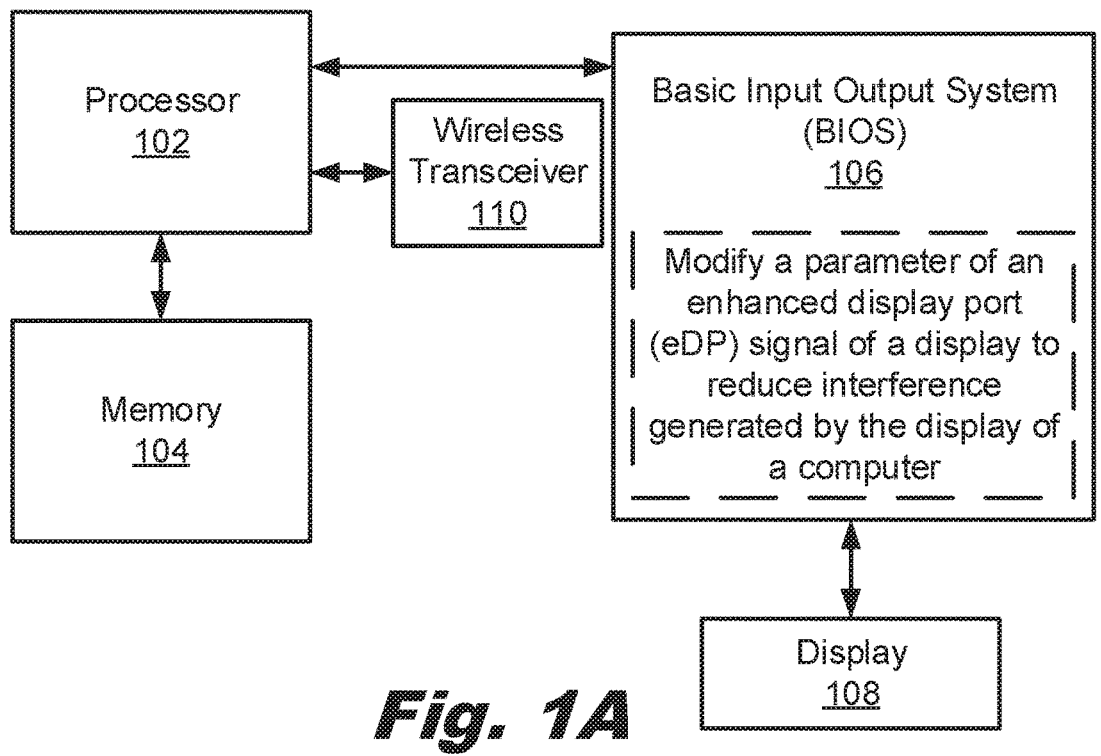
FIG. 1A is a diagram of a computer for improving a status of a wireless signal, according to one example of principles described herein.

As noted above, to wirelessly communicate, the computer includes networking hardware, such as a wireless transceiver. The wireless transceiver includes a processor, memory and an antenna that allows the computer to connect to the Wi-Fi network, via the wireless signal, such that the computer can exchange data with the other computers, the peripheral devices and the internet.

Often, the wireless transceiver is located away from an access point of the Wi-Fi network. If the wireless transceiver is located too far away from the access point, the wireless signal may be too weak for the wireless transceiver to receive the wireless signal. Further, electrical components in a display of a computer can interfere with the wireless signal. This limits the range of wireless connectivity especially when the wireless transceiver of the computer is located far away from the access point and the display is generating interference.

Consequently, the principles described herein include, for example, a computer for improving a status of a wireless signal. The computer includes a display, a wireless transceiver, a processor and memory to monitor a status of a wireless signal of the wireless transceiver and a Basic Input Output System (BIOS) to, and in response to the status indicating a degradation of the wireless signal and receiving a command to improve the status of the wireless signal, modify a parameter of an enhanced display port (eDP) signal of the display to reduce interference with the wireless signal generated by the display of the computer.

In another example, the principles described herein include a system for improving a status of a wireless signal. The system includes a wireless transceiver, a processor and memory to monitor a status of a wireless signal of the wireless transceiver, a display to display a message associated with the wireless signal, the message indicating the status of the wireless signal for a computer and how to improve the status of the wireless signal and a BIOS to, and in response to the status indicating a degradation of the wireless signal and receiving a command to improve the status of the wireless signal, modify a parameter of an eDP signal of the display to reduce interference with the wireless signal generated by the display of the computer.

In another example, the principles described herein include a method for improving a status of a wireless signal. The method includes with a processor and memory of a computer, monitoring a status of a wireless signal of a wireless transceiver, in response to the status indicating a degradation of the wireless signal, displaying, via a display of the computer, a message associated with the wireless signal, the message indicating the status of the wireless signal for the computer and prompting a user to press a hotkey to improve the status of the wireless signal and in response to a command issued when the hotkey is pressed, modifying, via a BIOS, a parameter of an eDP signal of the display to reduce interference with the wireless signal caused by the display of the computer.

In the present specification and in the appended claims, the term "status" means an indication as to a strength of a wireless signal as received by a wireless transceiver. The status can indicate the strength of the wireless signal as text, colors, graphics, images, or combinations thereof.

In the present specification and in the appended claims, the term "interference" means an undesired wideband noise. The interference may be a wideband noise that is created by an eDP signal interacting with analog and/or digital components of a display.

Further, as used in the present specification and in the appended claims, the term "a number of" or similar language is meant to be understood broadly as any positive number comprising 1 to infinity; zero not being a number, but the absence of a number.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described in connection with that example is included as described, but may not be included in other examples.

Referring now to the figures, FIG. 1A is a diagram of a computer for improving a status of a wireless signal, according to one example of principles described herein. As will be described below, a computer (100) includes a processor (102), memory (104), a BIOS (106), a display (108) and a wireless transceiver (110).

A computer (100) for improving a status of a wireless signal includes a display (108), a wireless transceiver (110), a processor (102) and memory (104) to monitor a status of a wireless signal of the wireless transceiver (110). The computer (100) includes a BIOS (106) to, in response to the status indicating a degradation of the wireless signal and receiving a command to improve the status of the wireless signal, modify a parameter of an eDP signal of the display (108) to reduce interference with the wireless signal generated by the display (108) of the computer (100).

Figure 1B:
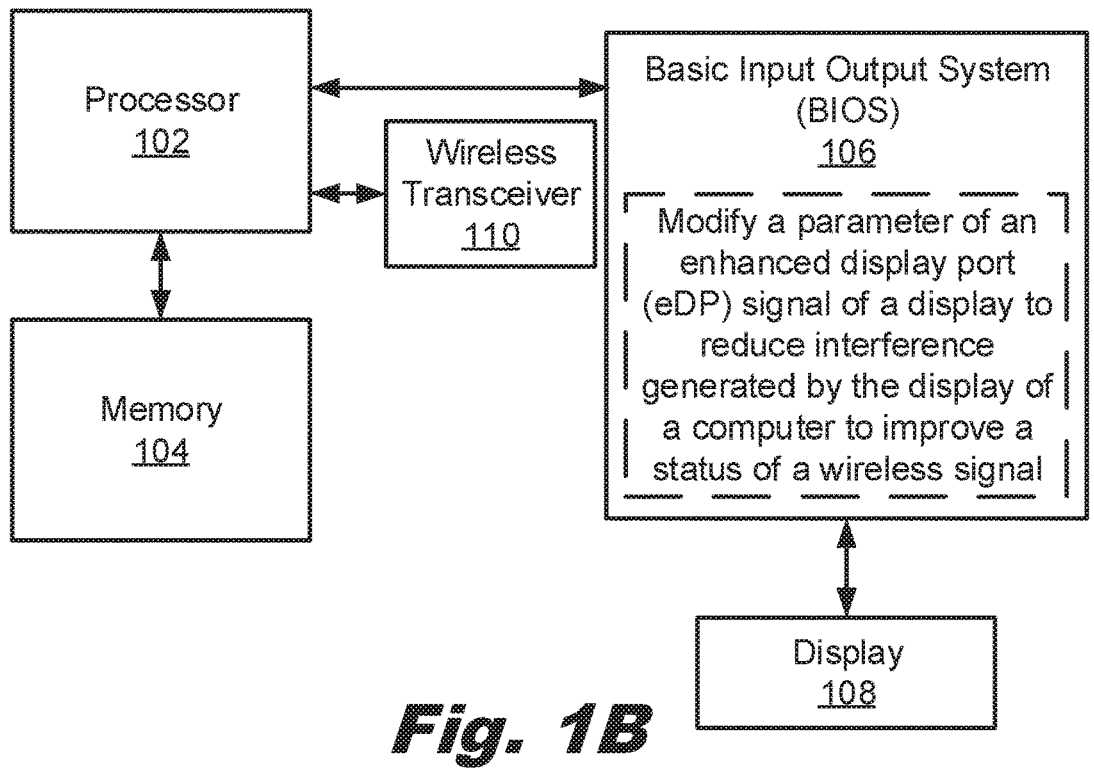
FIG. 1B is a diagram of a system for improving a status of a wireless signal, according to one example of principles described herein.

FIG. 1B is a diagram of a system for improving a status of a wireless signal, according to one example of principles described herein. As will be described below, the system (150) includes a processor (102), memory (104), a BIOS (106), a display (108) and a wireless transceiver (110).

The system (150) includes a wireless transceiver (110), a processor (102) and memory (104) to monitor a status of a wireless signal of the wireless transceiver (110). The system (150) includes a display (108) to display a message associated with the wireless signal, the message indicating the status of the wireless signal for a computer and how to improve the status of the wireless signal. The system (150) includes a BIOS (106) to, in response to the status indicating a degradation of the wireless signal and receiving a command to improve the status of the wireless signal, modify a parameter of an eDP signal of the display (108) to reduce interference with the wireless signal generated by the display (108) of the computer (100).

Figure 2:
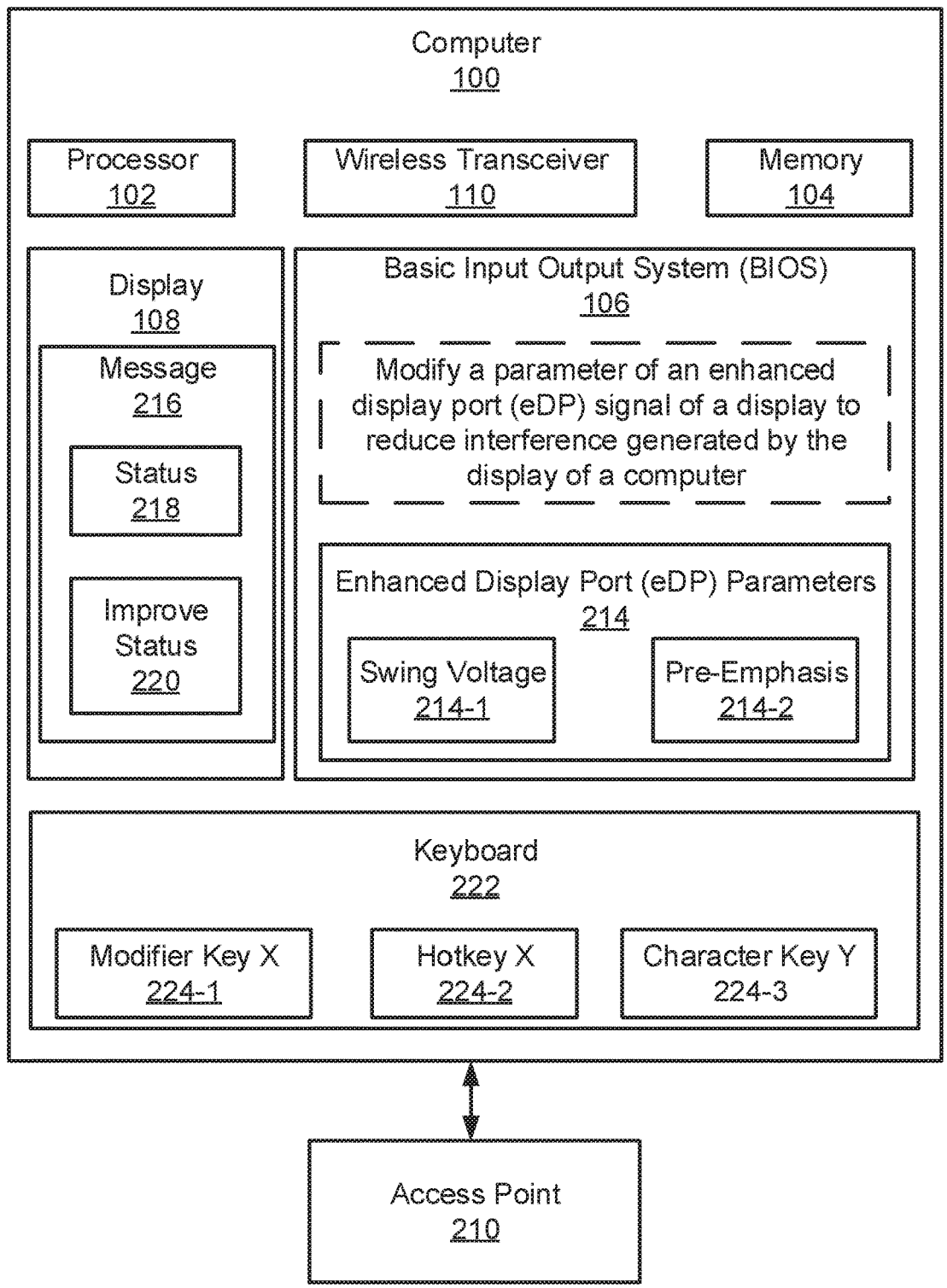
FIG. 2 is a diagram of a system for improving a status of a wireless signal, according to one example of principles described herein.

FIG. 2 is a diagram of a system for improving a status of a wireless signal, according to one example of principles described herein. As will be described below, the system (200) includes a processor (102), memory (104), a BIOS (106), a display (108) and a wireless transceiver (110).

As noted above, to wirelessly communicate, the computer (100) includes networking hardware, such as a wireless transceiver (110). The wireless transceiver (110) includes a processor, memory and an antenna that allows the computer (100) to connect to the Wi-Fi network via an access point (210) such that the computer (100) can exchange data with other computers, peripheral devices and the internet. In some examples, the wireless transceiver (110) is a wireless local area network (WLAN) radio module.

The computer (100) includes a processor (102) and memory (104) to monitor a status (218) of a wireless signal of the wireless transceiver (110). For example, the processor (102) and memory (104) check information coming from the wireless transceiver (110). This includes determining if a received signal strength indication (RSSI) value is below −85 decibel-miliwatts (dBm) and a sensitivity of the wireless signal.

In an example, the status (218) is an indication as to the strength of a wireless signal as received by the wireless transceiver (110), For example, if the strength of the wireless signal as received by the wireless transceiver (110) has a RSSI value above −85 dBm and a high sensitivity, the status (218) indicates the strength of the wireless signal is excellent. If the strength of the wireless signal as received by the wireless transceiver (110) has a RSSI value of −85 dBm and a medium sensitivity, the status (218) indicates the strength of the wireless signal is good. If the strength of the wireless signal as received by the wireless transceiver (110) has a RSSI value below −85 dBm and a low sensitivity, the status (218) indicates the strength of the wireless signal is poor. As a result, the status (218) can be represented symbolically as excellent, good or poor. Other examples of how the status (218) can be represented will be described below.

The computer (100) includes a display (108). The display (108) is an output device for presenting information in visual form. The display (108) includes a number of analog and/or digital components. A eDP signal is transmitted from the computer (100) or system side to the display (108) to present information on the display (108). The display (108) is used to display a message (216) associated with the wireless signal. In an example, the message (216) indicates the status (218) of the wireless signal for the computer (100). The message (216) is displayed when the status (218) indicates the wireless signal is degrading.

The status (218) can indicate the strength of the wireless signal as text. For example, when the message (216) is displayed via the display (108), the status (218) can be indicated by a number of words such as the strength of the wireless signal is poor.

The status (218) can indicate the strength of the wireless signal as colors. For example, when a message is displayed via the display (108), the status (218) can be indicated by a color such as red indicating the strength of the wireless signal is poor. The status (218) can be indicated by a color such as yellow indicating the strength of the wireless signal is low. The status (218) can be indicated by a color such as green indicating the strength of the wireless signal is excellent.

The status (218) can indicate the strength of the wireless signal as graphics. For example, when the message (216) is displayed via the display (108), the status (218) can be indicated by a graphic such as a one bar indicating the strength of the wireless signal is poor. The status (218) can be indicated by a graphic such as two bars indicating the strength of the wireless signal is low. The status (218) can be indicated by a graphic such three bars indicating the strength of the wireless signal is excellent.

The status (218) can indicate the strength of the wireless signal as images. For example, when a message is displayed via the display (108), the status (218) can be indicated by an image such as a slash through a wireless signal icon indicating the strength of the wireless signal is poor. The status (218) can be indicated by an image such as a blinking wireless signal icon indicating the strength of the wireless signal is low. The status (218) can be indicated by an image such wireless signal icon indicating the strength of the wireless signal is excellent.

As mentioned above, the computer (100) includes the display (108) the message (216) associated with the wireless signal. In an example, the message (216) also displays how to improve (220) the status of the wireless signal. In an example, the message (216) prompts a user to press a hotkey (224) to improve the status (218) of the wireless signal.

In an example, the hotkey (224) is a dedicated key on a keyboard (222) of the computer (100). In this example, hotkey X (224-2) is a dedicated key on a keyboard (222) of the computer (100). In another example, the hotkey is combination of a modifier key and a character key. For example, modifier key X (224-1) and character key Y (224-3). Once the hotkey (224) is press, this sends a command to the BIOS (106). However, if the user does not press the hotkey (224), the command is not sent to the BIOS (106). As a result, the user decides if the they want better wireless connectivity or not.

As mentioned above, the computer (100) includes the BIOS (106). The BIOS (106) to, in response to the status (218) indicating a degradation of the wireless signal and receiving the command to improve the status of the wireless signal when the user presses the hotkey (224), modifies a parameter of an eDP signal of the display (108) to reduce interference with the wireless signal generated by the display (108) of the computer (100). For example, one of the programs of the BIOS (106) enables access to register setting of the display (108) once the hotkey (224) is pressed. As will be descried in FIG. 6, the register settings include parameters such as voltage swing values and pre-emphasis values. The voltage swing is related to a peak to peak values range of 0.18 volts (V) to 1.38 V. The pre-emphasis changes an eDP eye height. In some examples, the pre-emphasis does not have absolute values since it is relative as defined in equation 1 below $$\text{Eye height}=(\text{one level}-3\sigma)-(\text{zero level}+3\sigma) \quad \text{Eq. 1}$$

Where level one is the top peak voltage of an eDP signal, the zero level is the bottom peak voltage of the eDP signal and $3\sigma$ is on offset associated with the top and bottom peak voltage of the eDP signal. The parameters are predetermined and verified such that the quality of the eDP signal is not impacted such that the display's performance is not significantly impacted.

In an example, the BIOS (106) modifies a voltage swing (214-1) of the eDP signal to reduce a voltage level of the eDP signal. The voltage swing (214-1) can be modified based on the values for voltage swing (214-1) in register 0, 1 or 2 as described in FIG. 6.

In an example, the BIOS (106) modifies a pre-emphasis (214-2) of the eDP signal to reduce a voltage level of the eDP signal. The pre-emphasis (214-2) can be modified based on the values for pre-emphasis (214-2) in register 0, 1 or 2 as described in FIG. 6.

In an example, the BIOS (106) modifies the parameters (214) to filter fundamental frequencies of the eDP signal. For example, by modifying the parameters (214), fundamental frequencies of 1 to 5 gigahertz (Ghz) can be filter, Since a wireless signal operates on 2.4 and 5 Ghz, reducing these fundamental frequencies reduces interference with the wireless signal generated by the display (108).

In some examples, the interference generated by the display (108) of the computer (100) is reduced up to 8 decibel (dB) based on the BIOS (106) modifying the parameters (214) of the eDP signal. As a result, the range of wireless connectivity of the computer (100) can be increased especially when the wireless transceiver (110) is located far away from the access point because of the reduction of the interference generated by the display (108).

In some examples, once the parameter has been modified, the processor (102) and memory (104) monitor the status (218) of a wireless signal of the wireless transceiver (110). If the status (218) has improved, a subsequent message is displayed indicating the status (218) has improved. However, if the status (218) has not improved, a parameter from another register is used. The status (218) is then rechecked and modified until the status (218) improves.

An overall example will now be described. The processor (102) and memory (104) of the computer (100) monitor a status of a wireless signal of a wireless transceiver (110). In response to the status (218) indicating a degradation of the wireless signal, the display (108) of the computer (100), displays a message (216) associated with the wireless signal. In this example, the message (216) indicates the status (218) of the wireless signal for the computer (100) as indicated by a red circle in the message (216). The message (216) prompts the user to press a hotkey X (224-2) to improve the status (218) of the wireless signal, Once hotkey X (224-2) is pressed, a command is issued. This command instructs the BIOS (106) to modify a parameter (214) of an eDP signal of the display (108) to reduce interference with the wireless signal caused by the display (108) of the computer (100). In this example, the BIOS modifies the voltage swing (214-1) from the value located in register 1 to the value located in register 0 and the pre-emphasis (214-2) remains at 1. An illustrated of this example is located in FIGS. 7A and 7B.

Figure 3:
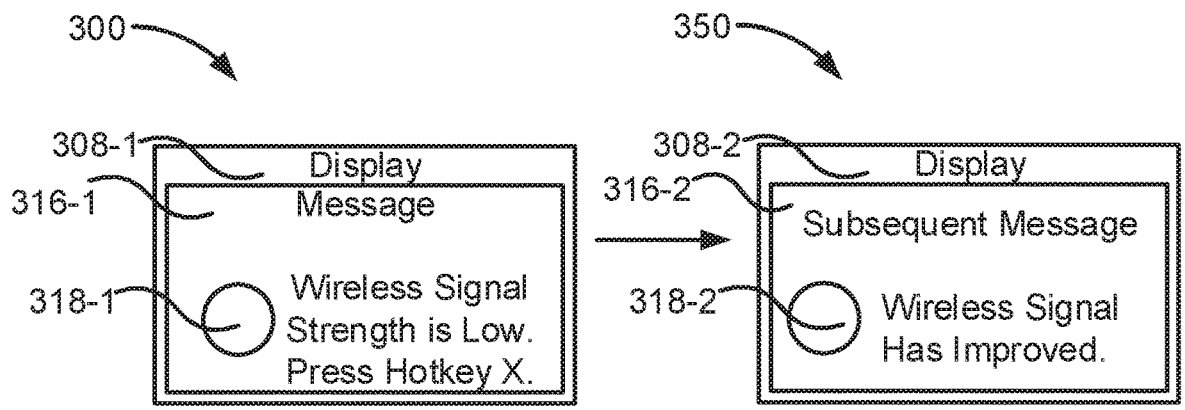
FIG. 3 is an example of a message and a subsequent message, according to one example of principles described herein.

FIG. 3 is an example of a message and a subsequent message, according to one example of principles described herein. As will be described below, the display (308) of the computer (100) displays a message (316) associated with the wireless signal.

In this example, the message (316-1) indicates the status (318-1) of the wireless signal for the computer (100) as indicated by a red circle in the message (316-1). This indicates the strength of the wireless signal is poor. The message (316-1) prompts the user to press a hotkey X (224-2) to improve the status (218) of the wireless signal. Once hotkey X (224-2) is pressed, a command is issued. This command instructs the BIOS (106) to modify a parameter (214) of an eDP signal of the display (108) to reduce interference with the wireless signal caused by the display (108) of the computer (100) as described above. The processor (102) and memory (104) again monitor the status of the wireless signal of the wireless transceiver (110) once the parameters of the eDP signal have been modified. If the parameters of the eDP signal have been modified such that the status of the wireless signal improves, the display (308-2) displays a subsequent message (316-2), the subsequent message (316-2) displaying the status (318-2) of the wireless signal and indicating the status (318-2) of the wireless signal has improved.

Figure 4:
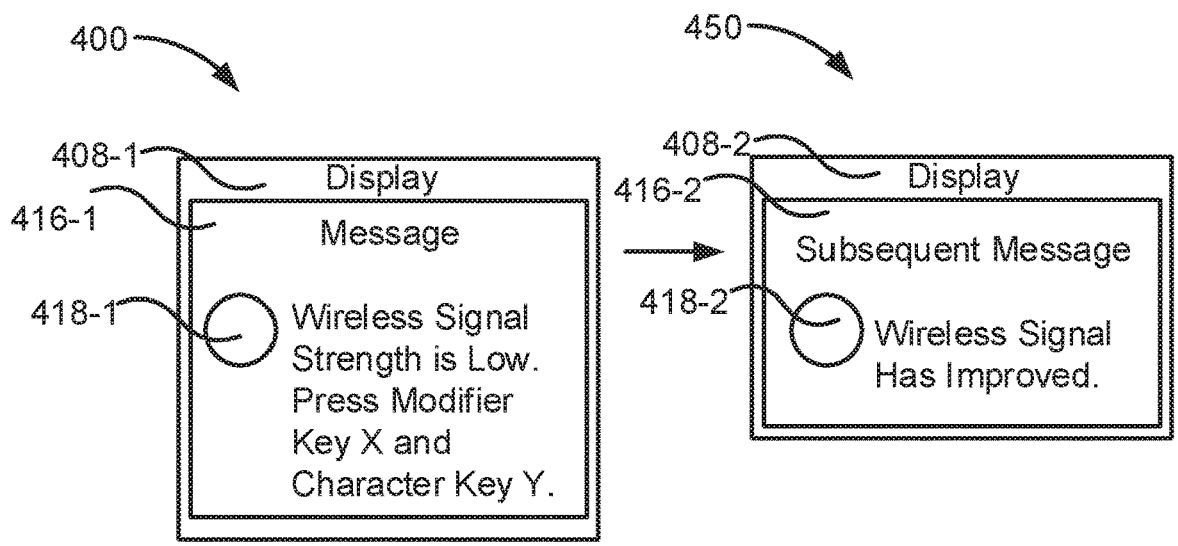
FIG. 4 is an example of a message and a subsequent message, according to one example of principles described herein.

FIG. 4 is an example of a message and a subsequent message, according to one example of principles described herein. As will be described below, the display (408) of the computer (100) displays a message (416) associated with the wireless signal.

In this example, the message (416-1) indicates the status (418-1) of the wireless signal for the computer (100) as indicated by a yellow circle in the message (416-1). This indicates the strength of the wireless signal is low. The message (416-1) prompts the user to press a modifier key X (224-1) and character key Y (224-3) (i.e. a hotkey) to improve the status (418) of the wireless signal. Once modifier key X (224-1) and character key Y (224-3) are pressed, a command is issued. This command instructs the BIOS (106) to modify a parameter (214) of an eDP signal of the display (108) to reduce interference with the wireless signal caused by the display (108) of the computer (100) as described above. The processor (102) and memory (104) again monitor the status of the wireless signal of the wireless transceiver (110) once the parameters of the eDP signal have been modified. If the parameters of the eDP signal have been modified such that the status of the wireless signal improves, the display (408-2) displays a subsequent message (416-2), the subsequent message (416-2) displaying the status (418-2) of the wireless signal and indicating the status (418-2) of the wireless signal has improved as a green circle.

Figure 5:
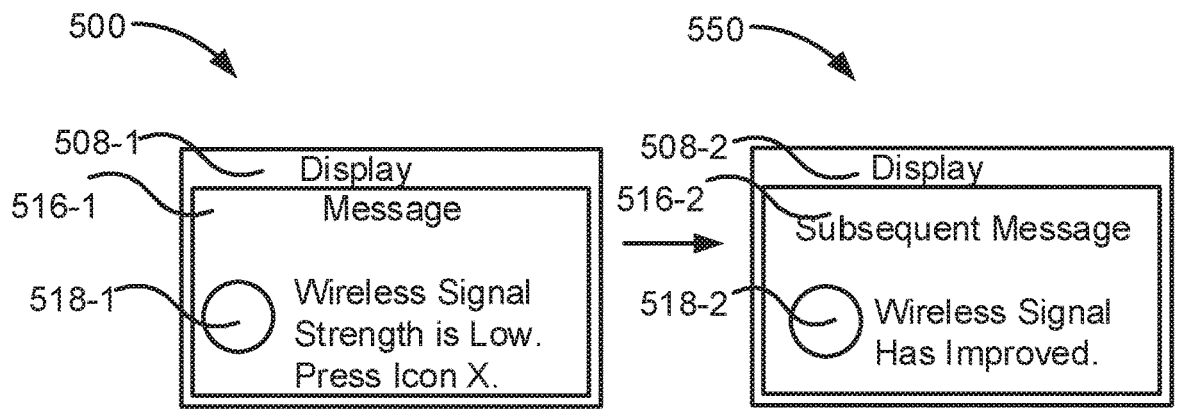
FIG. 5 is an example of a message and a subsequent message, according to one example of principles described herein.

FIG. 5 is an example of a message and a subsequent message, according to one example of principles described herein. As will be described below, the display (508) of the computer (100) displays a message (516) associated with the wireless signal.

In this example, the message (516-1) indicates the status (518-1) of the wireless signal for the computer (100) as indicated by a red circle in the message (516-1). This indicates the strength of the wireless signal is poor. The message (516-1) prompts the user to press icon X on the display (108) (i.e. a hotkey) to improve the status (518) of the wireless signal. Once the icon is pressed, a command is issued. This command instructs the BIOS (106) to modify a parameter (214) of an eDP signal of the display (108) to reduce interference with the wireless signal caused by the display (108) of the computer (100) as described above. The processor (102) and memory (104) again monitor the status of the wireless signal of the wireless transceiver (110) once the parameters of the eDP signal have been modified. If the parameters of the eDP signal have been modified such that the status of the wireless signal improves, the display (508-2) displays a subsequent message (516-2), the subsequent message (516-2) displaying the status (518-2) of the wireless signal and indicating the status (518-2) of the wireless signal has improved as a green circle.

FIG. 6 is a diagram of parameters of an eDP signal, according to one example of principles described herein. As will be described below, a number of registers (602) store values for a voltage swing (604) and a pre-emphasis (606).

As illustrated, the diagram (600) includes a number of register (602). For example, register 0 (602-1), register 1 (602-2), register 2 (602-3).

Register 0 (602-1) stores voltage swing value A (604-1) and a pre-emphasis value A (606-1) in memory. Voltage swing value A (604-1) and a pre-emphasis value A (606-1) are predetermined values that reduce the voltage level of the eDP signal, but do not degrade the performance of the display (108). Further, voltage swing value A (604-1) and a pre-emphasis value A (606-1) are different values from the other voltage swing values (604) and pre-emphasis values (606) stored in the other registers (602).

Register 1 (602-2) stores voltage swing value B (604-2) and a pre-emphasis value B (606-2) in memory. Voltage swing value B (604-2) and a pre-emphasis value B (606-2) are predetermined values that reduce the voltage level of the eDP signal, but do not degrade the performance of the display (108). Further, voltage swing value B (604-2) and a pre-emphasis value B (606-2) are different values from the other voltage swing values (604) and pre-emphasis values (606) stored in the other registers (602).

Register 2 (602-3) stores voltage swing value C (604-3) and a pre-emphasis value C (606-3) in memory. Voltage swing value C (604-3) and a pre-emphasis value C (606-3) are predetermined values that reduce the voltage level of the eDP signal, but do not degrade the performance of the display (108). Further, voltage swing value C (604-3) and a pre-emphasis value C (606-3) are different values from the other voltage swing values (604) and pre-emphasis values (606) stored in the other registers (602).

In one example, once the hotkey (224) is pressed, the BIOS (106) modifies the parameters of the eDP signal by using these voltage swing values (604) and pre-emphasis values (606) in the registers (602). For example, the BIOS (106) modified the eDP parameters by using voltage swing value A (604-1) and pre-emphasis values C (606-3) in the registers 0 (602-1) and register 2 (602-3). If swing value A (604-1) and pre-emphasis values C (606-3) does not improve the status of the wireless signal, other voltage swing values (604) and pre-emphasis values (606) in the registers can be used until the status of the wireless signal is improved.

Figure 7A:
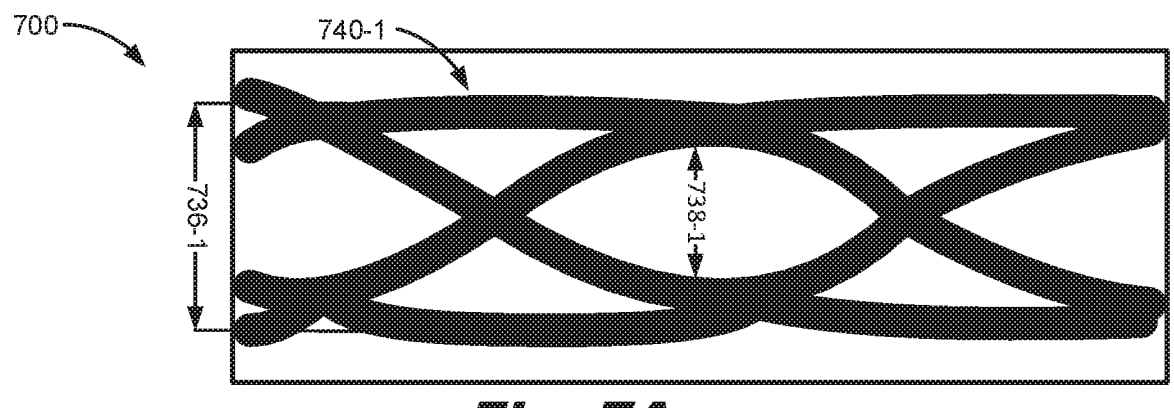
FIG. 7A is a diagram of an eDP signal, according to one example of principles described herein.

FIG. 7A is a diagram of an eDP signal, according to one example of principles described herein. As will be described in FIGS. 7A and 7B, parameters of the eDP signal are modified to reduce interference with the wireless signal generated by the display (108) of the computer (100).

In this example, the diagram (700) includes an eDP signal (740-1) of amplitude vs time. In this example, the parameters of the eDP signal (740-1) include a voltage swing set to the value in register 1 and a pre-emphasis set to the value in register 1. This results in the peak to peak height (736-1) of the eDP signal (740-1) to be 364.50 millivolts (mV). Further the eDP eye height (736-1) of the eDP signal (740-1) is 159.54 mV. As will be described below in FIG. 7B, the voltage swing and a pre-emphasis are modified to reduce interference with the wireless signal generated by the display (108) of the computer (100).

Figure 7B:
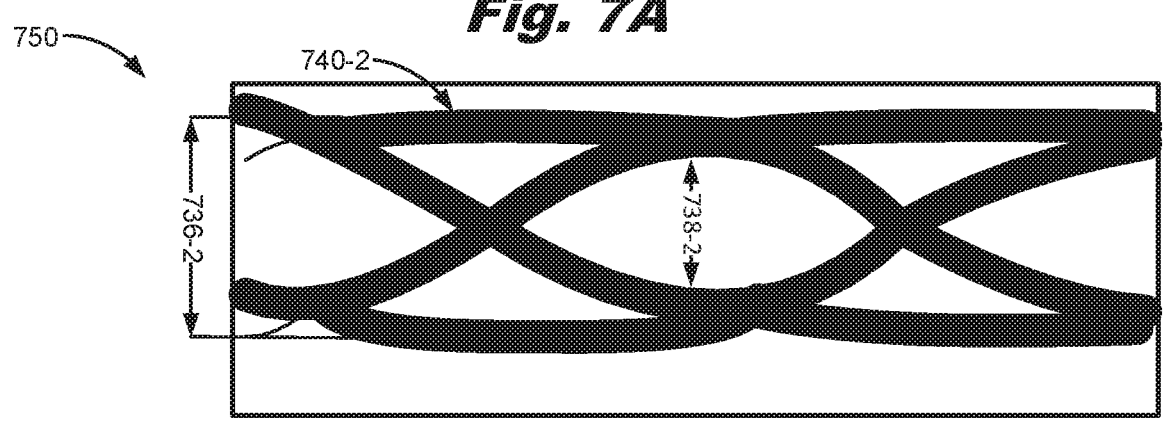
FIG. 7B is a diagram of an eDP signal, according to one example of principles described herein.

FIG. 7B is a diagram of an eDP signal, according to one example of principles described herein. As will be described below, parameters of the eDP signal are modified to reduce interference with the wireless signal generated by the display (108) of the computer (100). In this example, the parameters of the eDP signal (740-2) include the voltage swing modified to the value in register 0 and the pre-emphasis remains at the value in register 1. This results in the peak to peak height (736-2) of the eDP signal (740-2) to be 288.50 mV, a reduction of 76 mV. Further the eDP eye height (736-2) of the eDP signal (740-2) is 143.17 mV, a reduction of 16.37 mV. As a result, the interference generated by the display (108) of the computer (100) is reduced by the BIOS (106) modifying a voltage swing of the eDP signal. In this example, the BIOS modifies the voltage swing of the eDP signal to reduce a voltage level of the eDP signal while maintaining an eye height of the eDP signal.

Although the pre-emphasis was not modified in this example, the interference generated by the display (108) of the computer (100) can also be reduced by the BIOS (106) modifying a pre-emphasis of the eDP signal. In an example, the BIOS (106) modifies the pre-emphasis of the eDP signal to reduce a voltage level of the eDP signal while maintaining an eye height of the eDP signal as described by equation 1 above.

In some examples if the eye height of the eDP signal is not maintained, the display's performance is impacted. This results in the reduction of display resolution, flickering of the display and bad signal quality of the eDP signal. In FIG. 7B, the eye height of the eDP signal is maintained.

Figure 8:
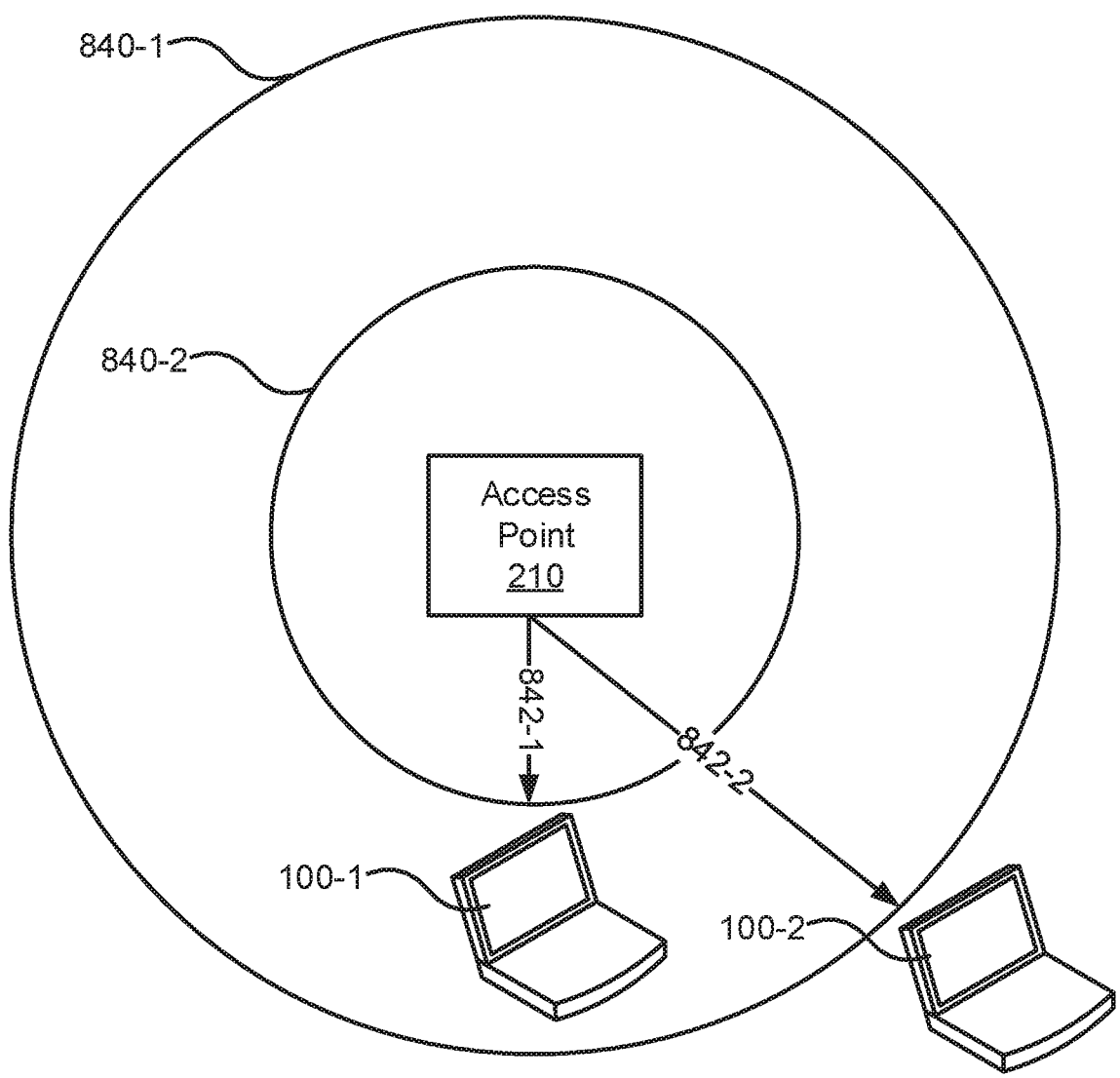
FIG. 8 is a diagram of extending an operational range of a wireless signal based on modifying parameters of an eDP signal, according to one example of principles described herein.

FIG. 8 is a diagram of extending an operational range of a wireless signal based on modifying parameters of a eDP signal, according to one example of principles described herein. As will be described below, parameters of the eDP signal are modified to increase the range of wireless connectivity.

As illustrated, an access point (210) is used to connect to the computer (100) to a Wi-Fi network such that the computer (100) can exchange data with other computers, peripheral devices and the Internet. In this example, range of the wireless transceiver of the computer (100-1) is indicated by arrow 842-1 due to the interference generated by the display (108). As a result, the computer (100-1) is able to connect to the Wi-Fi network if the computer (100-1) is located inside circle 840-2. However, if the computer (100-1) is located outside circle 840-2, the computer (100-1) is not able to connect to the Wi-Fi network due to the interference generated by the display (108). In this example, the wireless signal strength at circle 840-2 is −80 dBm. The wireless signal strength at circle 840-1 is −85.3 dBm Once the parameters of the eDP signal are modified, the interference generated by the display (108) is reduced such that the range of wireless connectivity for the computer 100-2 is extended to the parameter of circle 840-1.

Figure 9:
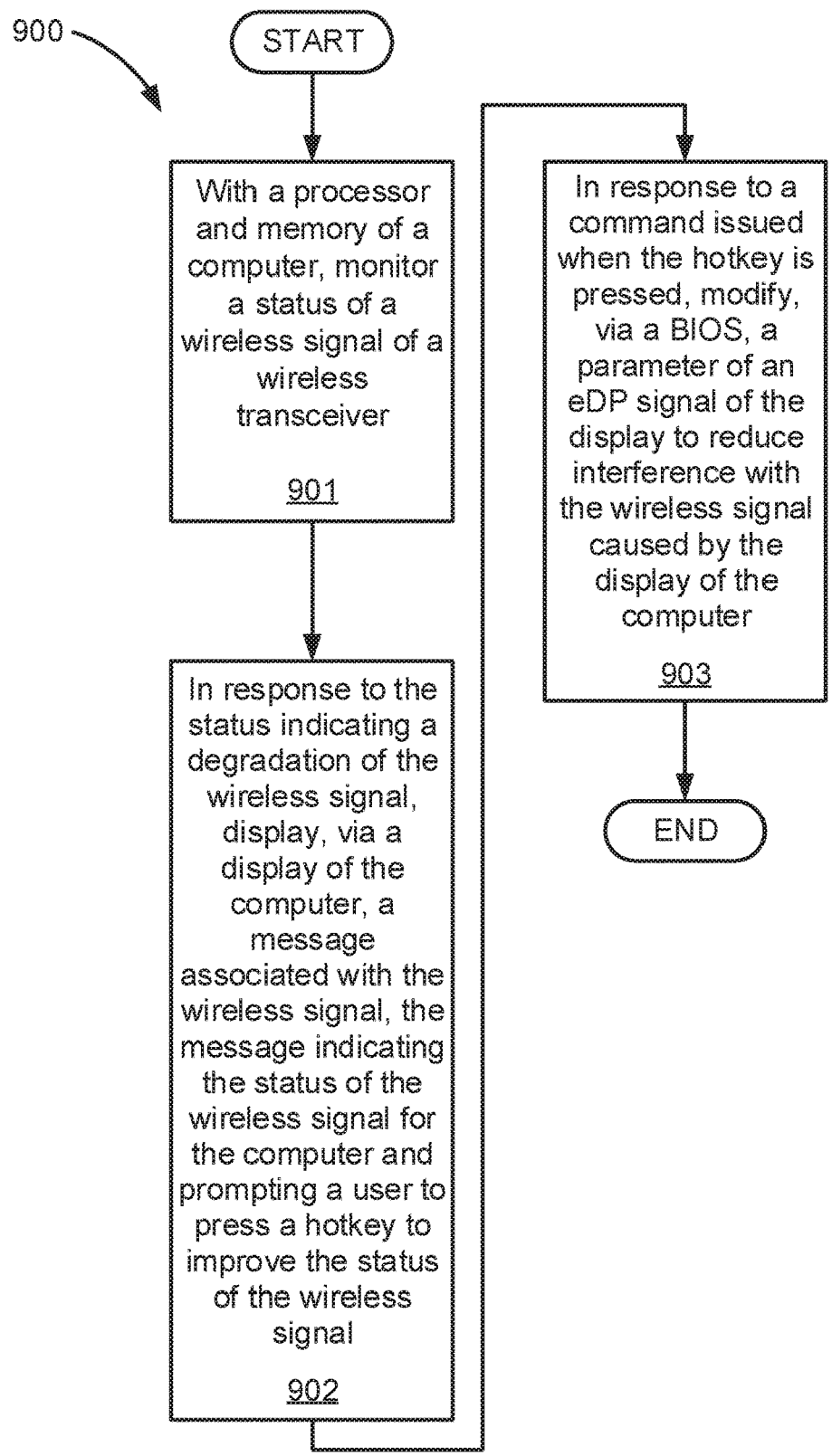
FIG. 9 is a flowchart of a method for improving a status of a wireless signal, according to one example of principles described herein.

FIG. 9 is a flowchart of a method for improving a status of a wireless signal, according to one example of principles described herein. The method (900) may be executed by the system of FIGS. 1A, 1B or FIG. 2. The method (900) includes with a processor and memory of a computer, monitoring (901) a status of a wireless signal of a wireless transceiver, in response to the status indicating a degradation of the wireless signal, displaying (902), via a display of the computer, a message associated with the wireless signal, the message indicating the status of the wireless signal for the computer and prompting a user to press a hotkey to improve the status of the wireless signal and in response to a command issued when the hotkey is pressed, modifying (903), via a BIOS, a parameter of an eDP signal of the display to reduce interference with the wireless signal caused by the display of the computer.

As mentioned above, the method (900) includes with a processor and memory of a computer, monitoring (901) a status of a wireless signal of a wireless transceiver. In an example, the processor and memory monitor the status of the wireless signal of the wireless transceiver based on time intervals. For example, the processor and memory monitor the status of the wireless signal of the wireless transceiver every 10 seconds. In another example, the processor and memory monitor the status of the wireless signal of the wireless transceiver based on an event. An event includes when a user sends data over the wireless signal.

As mentioned above, the method (900) includes in response to the status indicating a degradation of the wireless signal, displaying (902), via a display of the computer, a message associated with the wireless signal, the message indicating the status of the wireless signal for the computer and prompting a user to press a hotkey to improve the status of the wireless signal. In some examples, the method (900) automatically sends the command to the BIOS based on the degradation of the wireless signal without the user pressing the hotkey.

As mentioned above, the method (900) includes in response to a command issued when the hotkey is pressed, modifying (903), via a BIOS, a parameter of an eDP signal of the display to reduce interference with the wireless signal caused by the display of the computer. In some examples, one parameter of the eDP signal is modified. In other examples, more than one parameter of the eDP signal is modified. In some examples, the parameter of the eDP signal is modified based on rules. For example, a voltage swing is to be modified and tested before a pre-emphasis is modified.

Figure 10:
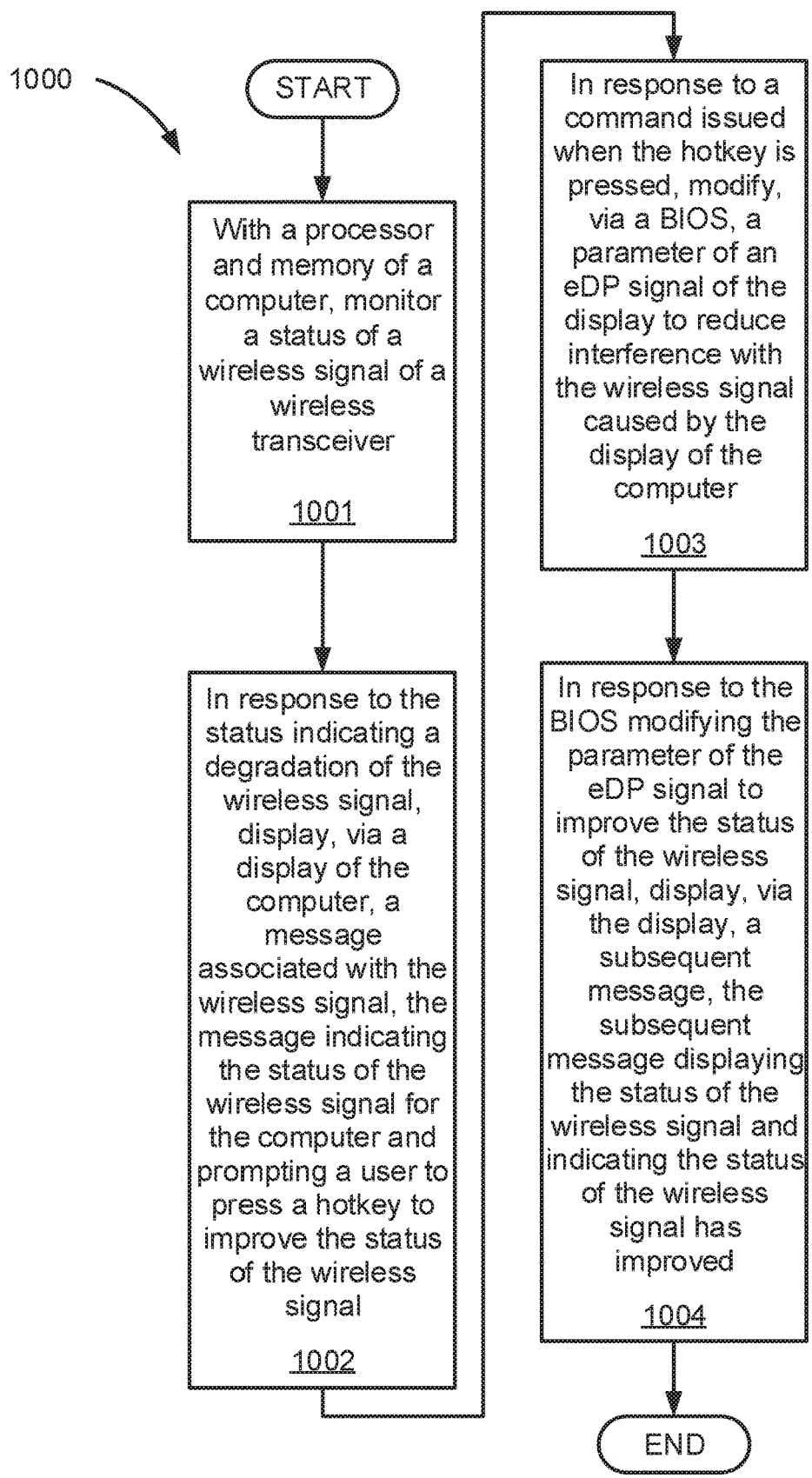
FIG. 10 is a flowchart of a method for improving a status of a wireless signal, according to one example of principles described herein.

FIG. 10 is a flowchart of a method for improving a status of a wireless signal, according to one example of principles described herein. The method (1000) may be executed by the system of FIGS. 1A, 1B or FIG. 2. The method (1000) includes with a processor and memory of a computer, monitoring (1001) a status of a wireless signal of a wireless transceiver, in response to the status indicating a degradation of the wireless signal, displaying (1002), via a display of the computer, a message associated with the wireless signal, the message indicating the status of the wireless signal for the computer and prompting a user to press a hotkey to improve the status of the wireless signal, in response to a command issued when the hotkey is pressed, modifying (1003), via a BIOS, a parameter of an eDP signal of the display to reduce interference with the wireless signal caused by the display of the computer and in response to the BIOS modifying the parameter of the eDP signal to improve the status of the wireless signal, displaying (1004), via the display, a subsequent message, the subsequent message displaying the status of the wireless signal and indicating the status of the wireless signal has improved.

As mentioned above, the method (1000) includes in response to the BIOS modifying the parameter of the eDP signal to improve the status of the wireless signal, displaying (1004), via the display, a subsequent message, the subsequent message displaying the status of the wireless signal and indicating the status of the wireless signal has improved. In some examples, the subsequent message is displayed for a predetermined amount of time such as 20 seconds.

The preceding description has been presented to illustrate and describe examples of the principles described. This description is not intended to be exhaustive or to limit these principles to any precise form disclosed. Many modifications and variations are possible in light of the above teaching.

What is claimed is:

1. A computer comprising:
   a display;
   a wireless transceiver;
   a processor and memory to monitor a status of a wireless signal of the wireless transceiver; and
   a Basic Input Output System (BIOS) to, in response to the status indicating a degradation of the wireless signal and receiving a command to improve the status of the wireless signal, modify a parameter of an enhanced display port (eDP) signal of the display to reduce interference with the wireless signal generated by the display of the computer.

2. The computer of claim 1, wherein the BIOS modifies a voltage swing of the eDP signal to reduce a voltage level of the eDP signal.

3. The computer of claim 1, wherein the BIOS modifies a pre-emphasis of the eDP signal to reduce a voltage level of the eDP signal.

4. The computer of claim 1, wherein the BIOS modifies the parameter to filter fundamental frequencies of the eDP signal.

5. The computer of claim 1, wherein the interference generated by the display of the computer is reduced up to 8 decibel (dB) based on the BIOS modifying the parameter of the eDP signal.

6. The computer of claim 1, wherein the processor and memory:
   determine when a received signal strength indication (RSSI) value of the wireless signal is below a predetermined threshold; and
   responsive to a determination that the RSSI value of the wireless signal is below the predetermined threshold, issue a command to improve the status of the wireless signal.

7. The computer of claim 1, wherein the predetermined threshold is −85 decibel-miliwatts (dBm).

8. The computer of claim 1, further comprising a register to store parameter values for the eDP signal.

9. A system comprising:
   a wireless transceiver;

a processor and memory to monitor a status of a wireless signal of the wireless transceiver;

a display to display a message associated with the wireless signal, the message indicating the status of the wireless signal for a computer and how to improve the status of the wireless signal; and a Basic Input Output System (BIOS) to, in response to the status indicating a degradation of the wireless signal and receiving a command to improve the status of the wireless signal, modify a parameter of an enhanced display port (eDP) signal of the display to reduce interference with the wireless signal generated by the display of the computer.

10. The system of claim 9, wherein the message prompts a user to press a hotkey to improve the status of the wireless signal, the hotkey sending the command to the BIOS when pressed.

11. The system of claim 9, wherein the hotkey is a dedicated key on a keyboard of the computer.

12. The system of claim 9, wherein the hotkey is combination of a modifier key and a character key.

13. A method comprising:

with a processor and memory of a computer, monitoring a status of a wireless signal of a wireless transceiver;

in response to the status indicating a degradation of the wireless signal, displaying, via a display of the computer, a message associated with the wireless signal, the message indicating the status of the wireless signal for the computer and prompting a user to press a hotkey to improve the status of the wireless signal;

in response to a command issued when the hotkey is pressed, modifying, via a Basic Input Output System (BIOS), a voltage swing of an enhanced display port (eDP) signal of the display to reduce interference with the wireless signal caused by the display of the computer; and in response to the status of the wireless signal remaining below a predetermined threshold, modifying a pre-emphasis of the eDP signal of the display to reduce interference with the wireless signal caused by the display of the computer.

14. The method of claim 13, wherein the interference generated by the display of the computer is reduced by the BIOS modifying the voltage swing of the eDP signal.

15. The method of claim 14, wherein the BIOS modifies the voltage swing of the eDP signal to reduce a voltage level of the eDP signal while maintaining an eye height of the eDP signal.

16. The method of claim 13, wherein the interference generated by the display of the computer is reduced by the BIOS modifying the pre-emphasis of the eDP signal.

17. The method of claim 16, wherein the BIOS modifies the pre-emphasis of the eDP signal to reduce a voltage level of the eDP signal while maintaining an eye height of the eDP signal.

18. The method of claim 13, further comprising in response to the BIOS modifying the parameter of the eDP signal to improve the status of the wireless signal, displaying, via the display, a subsequent message, the subsequent message displaying the status of the wireless signal and indicating the status of the wireless signal has improved.

19. The method of claim 13, further comprising classifying the status of the wireless signal.

20. The method of claim 13, further comprising receiving a user command to improve the status of the wireless signal.

* * * * *